United States Patent
Kawazu et al.

(10) Patent No.: US 9,975,527 B2
(45) Date of Patent: May 22, 2018

(54) MOUNTING STRUCTURE FOR PEDAL DEVICE

(71) Applicant: TOYOTA JIDOSHA KABUSHIKI KAISHA, Toyota-shi, Aichi-ken (JP)

(72) Inventors: Toshihiro Kawazu, Okazaki (JP); Satoshi Uchida, Toyota (JP); Takaomi Kondo, Toyota (JP); Naruki Yamamoto, Toyota (JP); Yasutoshi Noguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 15/010,532

(22) Filed: Jan. 29, 2016

(65) Prior Publication Data
US 2016/0272169 A1    Sep. 22, 2016

(30) Foreign Application Priority Data

Mar. 20, 2015  (JP) ................. 2015-057643

(51) Int. Cl.
| | | |
|---|---|---|
| *B60T 7/06* | (2006.01) | |
| *B60T 7/04* | (2006.01) | |
| *B60T 11/18* | (2006.01) | |
| *G05G 1/30* | (2008.04) | |
| *G05G 1/36* | (2008.04) | |

(Continued)

(52) U.S. Cl.
CPC ....... *B60T 7/06* (2013.01); *B60T 7/04* (2013.01); *B60T 11/18* (2013.01); *G05G 1/30* (2013.01); *G05G 1/36* (2013.01); *G05G 1/44* (2013.01); *G05G 1/46* (2013.01)

(58) Field of Classification Search
CPC ... G05G 1/30; G05G 1/36; G05G 1/44; B60T 7/04; B60T 7/06; B60T 11/18; B62D 25/24
See application file for complete search history.

(56) References Cited

U.S. PATENT DOCUMENTS 6,176,340 B1 *   1/2001   Mizuma ................. B60T 7/065
                                                                180/274
2007/0175692 A1   8/2007   Hasegawa et al.
(Continued)

FOREIGN PATENT DOCUMENTS

EP           1813488 A2     8/2007
JP         H02-117959 U     9/1990
(Continued)

*Primary Examiner* — Thomas C Diaz
(74) *Attorney, Agent, or Firm* — Oliff PLC (57) ABSTRACT

A mounting structure for a pedal device including a pedal and a bracket is configured to mount the pedal device on a dash panel with the dash panel sandwiched by and between the bracket and a master cylinder device. The mounting structure includes: a plurality of fastening rods for fastening the bracket to the master cylinder device; and a plurality of collars interposed between the dash panel and the bracket for spacing the dash panel and the bracket apart from each other, the fastening rods extending through the collars. The collars include a pair of collars, and one of the pair of collars has an extending portion extending along the dash panel in a direction away from the other of the pair of collars and functions as a reinforcing member for reducing deformation of the dash panel caused when the pedal is stepped on.

16 Claims, 6 Drawing Sheets

(51) Int. Cl.
    *G05G 1/44*           (2008.04)
    *G05G 1/46*           (2008.04)

(56) References Cited

U.S. PATENT DOCUMENTS

2011/0162479 A1*   7/2011   Mori .................... B60T 7/06
                                                       74/512
2012/0325990 A1   12/2012   Ishizuki et al.
2015/0198965 A1    7/2015   Kitaguchi

FOREIGN PATENT DOCUMENTS

| JP | H11-020492 A | 1/1999 |
|---|---|---|
| JP | 2000-259271 A | 9/2000 |
| JP | 2009-073305 A | 4/2009 |
| JP | 2011-152564 A | 8/2011 |
| JP | 2014-004906 A | 1/2014 |

* cited by examiner

MOUNTING STRUCTURE FOR PEDAL DEVICE

The present application claims priority from Japanese Patent Application No. 2015-057643, which was filed on Mar. 20, 2015, the disclosure of which is herein incorporated by reference in its entirety.

BACKGROUND

Technical Field

The present disclosure relates to a structure for mounting, on a dash panel, a pedal device having a pedal configured to be stepped on in a vehicle brake system.

Description of Related Art

As described in JP-A-2009-073305, a pedal device including a pedal and a bracket that pivotally holds the pedal is mounted on a dash panel such that the bracket and a master cylinder device sandwich the dash panel therebetween. The surface of the dash panel is covered with a sound insulator. Thus, a plurality of collars through which fastening rods, such as bolts, respectively extend are interposed between the dash panel and the bracket for spacing the dash panel and the bracket apart from each other, as described in JP-A-2009-073305.

SUMMARY

In general, the dash panel is formed of a steel sheet having a comparatively small thickness, and there is a possibility that the dash panel is deformed locally at a portion thereof on which the pedal device is mounted when the pedal is stepped on. For preventing the local deformation of the dash panel, JP-A-2009-073305 proposes a technique of superposing a reinforcing steel sheet on the portion of the dash panel on which the pedal device is mounted. The disclosed embodiments have been developed in view of such situations. It is therefore one object of the embodiments to provide a mounting structure for a pedal device in which a novel reinforcing structure is applied to a portion of a dash panel on which a pedal device is mounted.

To achieve the object indicated above, the embodiments provide a mounting structure for a pedal device which includes a plurality of collars interposed between a dash panel and a bracket of the pedal device for spacing the dash panel and the bracket apart from each other and in which the plurality of collars include a pair of collars, one of which has an extending portion that extends along the dash panel in a direction away from the other of the pair of collars.

According to the mounting structure for the pedal device described above, the extending portion functions as a reinforcing member like a rib provided on the dash panel. It is thus possible to prevent or reduce deformation of the dash panel caused when the pedal is stepped on, without employing the above-indicated technique of superposing the reinforcing steel sheet between the bracket and the dash panel.

There will be exemplified and explained various example embodiments. The various disclosed features can be used in various combinations. In addition, the disclosure is not limited to the specific example embodiments described herein.

One aspect relates to a mounting structure for a pedal device that includes a pedal and a bracket that pivotally holds the pedal, the mounting structure being configured to mount the pedal device on a dash panel with the dash panel sandwiched by and between the bracket and a master cylinder device, the mounting structure comprising:

a plurality of fastening rods that are configured to respectively extend through a plurality of holes formed in the dash panel for fastening the bracket and the master cylinder device to each other; and a plurality of collars configured to be interposed between the dash panel and the bracket for spacing the dash panel and the bracket apart from each other, the plurality of fastening rods respectively extending through the plurality of collars. The plurality of collars include a pair of collars, and a first one of the pair of collars has an extending portion that extends along the dash panel in a direction away from a second one of the pair of collars, the extending portion reinforcing the dash panel and reducing deformation of the dash panel caused when the pedal is stepped on.

As later explained in detail, the pedal device is typically mounted on the dash panel by a plurality of fastening rods. The collars are intervening members through which the fastening rods extend. In other words, the fastening rods pass through the respective collars. Each fastening rod is like a bolt that extends from the master cylinder device, for instance. The fastening rods are disposed so as to enclose a link rod configured to activate the master cylinder device. The distal end of the link rod is coupled to the pedal at a position between a stepping surface of the pedal and a portion of the pedal at which the pedal is rotatably supported by the bracket. Consequently, when the pedal is stepped on, a force to deform an area of the dash panel enclosed by the fastening rods (hereinafter referred to as "enclosed area" where appropriate) is not generated, but a force to pivot or rotate the enclosed area as a whole is generated, and the force acts on the dash panel. As a result, the dash panel is deformed at its portion surrounding the enclosed area.

Among the plurality of collars through which the plurality of fastening rods extend, two of the collars that form a pair is defined as a pair of collars. In the mounting structure for the pedal device (hereinafter simply referred to as "mounting structure" where appropriate), one of the pair of collars is provided with the extending portion that extends along the dash panel in a direction away from the other of the pair of collars. That is, the extending portion extends along the dash panel outside the enclosed area described above. In a state in which the extending portion is in contact with the dash panel, the extending portion functions as a reinforcing member like a rib provided on the dash panel in order to reinforce the dash panel. According to the mounting structure, it is possible to effectively reduce the deformation of the dash panel caused when the pedal is stepped on.

Each of "the plurality of collars" is configured to have a predetermined length and to surround the fastening rod. Each collar need not be formed of a single member. For instance, each collar may be formed by two or more members that are joined to each other by bonding or the like. Further, the plurality of collars need not be independent of each other. For instance, two or more of the plurality of collars may be coupled integrally to each other.

As "the pair of collars", two of the plurality of collars may be selected depending upon a direction in which a force to deform the dash panel acts when the pedal is stepped on. Specifically, in an instance where the dash panel is deformed such that its portions that are distant from each other in an up-down direction are displaced relative to each other in a front-rear direction, two collars arranged in the up-down direction may be the pair of collars. In an instance where the dash panel is deformed such that its portions that are distant from each other in a right-left direction are displaced relative to each other in the front-rear direction, two collars arranged in the right-left direction may be the pair of collars. In the mounting structure, only one pair of collars may be provided or a plurality of pairs of collars may be provided. That is, the plurality of collars may form a plurality of pairs (e.g., two pairs).

The direction of extension of the "extending portion" is not limited to a direction in which a line connecting the pair of collars extends, but may be inclined with respect to the direction of extension of the line. In an instance where the extending portion presses the dash panel when the pedal is stepped on, the extending portion and the dash panel need not be necessarily bonded to each other. On the contrary, in an instance where the extending portion is moved away from the dash panel when the pedal is stepped on, the extending portion and the dash panel should be bonded to each other. This embodiment does not exclude a configuration in which the other of the pair of collars is also provided with the extending portion that extends along the dash panel in a direction away from the one of the pair of collars.

In terms of functioning as the reinforcing member, it is desirable that the thickness of the extending portion, namely, the dimension of the extending portion in a direction perpendicular to the dash panel, be relatively large. If the thickness of the extending portion is made equal to the length of the collar, namely, if the thickness of the extending portion is made equal to or substantially equal to a distance between the bracket and the dash panel in a state in which the pedal device is mounted, it is possible to reduce the deformation of the dash panel to a considerably high extent. Specifically, the effect of reducing the deformation of the dash panel becomes high by increasing the thickness of the extending portion to a certain extent, as compared with a case in which the steel sheet is superposed on the dash panel for reinforcement.

Another aspect relates to the mounting structure described above wherein the pedal device is configured to be mounted on the dash panel such that the pedal is held at a proximal portion thereof by the bracket so as to be pivotable about a pivot axis extending in a lateral direction and such that the pivot axis is located above the plurality of fastening rods while a stepping surface provided at a distal portion of the pedal is located below the plurality of fastening rods, and wherein the pair of collars consists of two of the plurality of collars that are spaced from each other in an up-down direction, and the extending portion extends upward or downward.

The mounting structure according to this aspect is suitable for an ordinary pedal device. When the pedal of the pedal device constructed as described is stepped on, the dash panel is deformed such that an area of the dash panel above the enclosed area (i.e., upper area) and an area of the dash panel below the enclosed area (i.e., lower area) are displaced relative to each other. Specifically, the upper area of the dash panel is displaced toward an operator of the pedal (hereinafter referred to as "pedal operator" where appropriate), and the lower area is displaced away from the pedal operator. In view of this, two of the plurality of collars that are distant from each other in the up-down direction are regarded as the pair of collars, and an upper one of the two collars is provided with the extending portion that extends upward or a lower one of the two collars is provided with the extending portion that extends downward. Consequently, the dash panel, on which the ordinary pedal device is mounted, is effectively prevented from being deformed when the pedal is stepped on. The direction of extension of the extending portion, i.e., "upward" or "downward", does not necessarily mean only "right above" or "right below". Therefore, even in an instance where the extending portion extends in a direction inclined with respect to the right above direction or the right below direction, e.g., where the extending portion extends obliquely upward or obliquely downward, it is to be construed that the extending portion extends upward or downward.

Another aspect relates to the mounting structure described above, wherein the first one of the pair of collars that has the extending portion is located below the second one of the pair of collars, and the extending portion extends downward.

Another aspect relates to the mounting structure described above, wherein the first one of the pair of collars that has the extending portion is located above the second one of the pair of collars, and the extending portion extends upward.

In the two aspects just mentioned, the collar on which the extending portion is provided is specifically limited to a particular collar. Further, the direction of extension of the extending portion is specifically limited to a particular direction. In the former aspect, the extending portion reinforces the lower area of the dash panel located below the enclosed area. In the latter one of the two forms, the extending portion reinforces the upper area of the dash panel located above the enclosed area. Either configuration is effective for reducing the deformation of the dash panel caused when the pedal is stepped on. In the former, the extending portion need not necessarily be bonded to the dash panel. In the latter, however, the extending portion should be bonded to the dash panel. It is noted that the above two aspects do not exclude a configuration in which the extending portion is provided on each of one and the other of the pair of collars.

Another aspect relates to the mounting structure described above, wherein the pedal device is configured such that the distal portion of the pedal is shifted with respect to the proximal portion of the pedal in a lateral direction, and the extending portion extends so as to be inclined in the lateral direction.

In most ordinary pedal devices, the stepping surface of the pedal is shifted leftward or rightward. In an instance where such a pedal device is mounted on the dash panel, the dash panel is not only deformed as described above, but also deformed such that an area of the dash panel located on the left side of the enclosed area (i.e., left area) and an area of the dash panel located on the right side of the enclosed area (i.e., right area) are displaced relative to each other. Specifically, one of the left area and the right area is displaced toward the pedal operator while the other of the left area and the right area is displaced away from the pedal operator. In short, the dash panel is deformed not only in the up-down direction but also in the right-left direction. According to this aspect, the extending portion extends so as to be inclined rightward or leftward. It is thus possible to effectively reduce the deformation of the dash panel in the right-left direction caused in the pedal device in which the stepping surface of the pedal is shifted rightward or leftward.

Another aspect relates to the mounting structure described above, wherein the plurality of collars include two pairs of collars each of which functions as the pair of collars, the two pairs of collars being spaced from each other in the lateral direction and located at the same position in the up-down direction.

The ordinary pedal device is mounted on the dash panel through four fastening rods disposed such that two of the four fastening rods are located above or below the other two of the four fastening rods and such that two of the four fastening rods are located rightward or leftward of the other two of the four fastening rods. In such a pedal device, left-side two collars are regarded as one pair of collars, and right-side two collars are regarded as another pair of collars. In this case, if the extending portion is provided on one of the two collars in each pair, the deformation of the dash panel can be more effectively prevented.

Another aspect relates to the mounting structure described above, wherein the pair of collars are connected to each other.

The pair of collars connected integrally to each other contribute to reduction in the number of components of the mounting structure. In view of mounting work for mounting the pedal device on the dash panel, the plurality of collars are desirably fixed to the dash panel in advance. The pair of collars connected integrally to each other allow simplification of work for fixing the pair of collars to the dash panel.

BRIEF DESCRIPTION OF THE DRAWINGS

The objects, features, advantages, and technical and industrial significance of the embodiments will be better understood by reading the following detailed description, when considered in connection with the accompanying drawings, in which.

DETAILED DESCRIPTION OF EMBODIMENTS

Referring to the drawings, there will be explained below in detail a mounting structure for a pedal device (hereinafter simply referred to as "mounting structure" where appropriate) according to one embodiment and mounting structures according to modifications of the embodiment. It is to be understood that the disclosure is not limited to the details of the following embodiments, but may be changed and modified based on the knowledge of those skilled in the art.

Figures 1A, 1B:
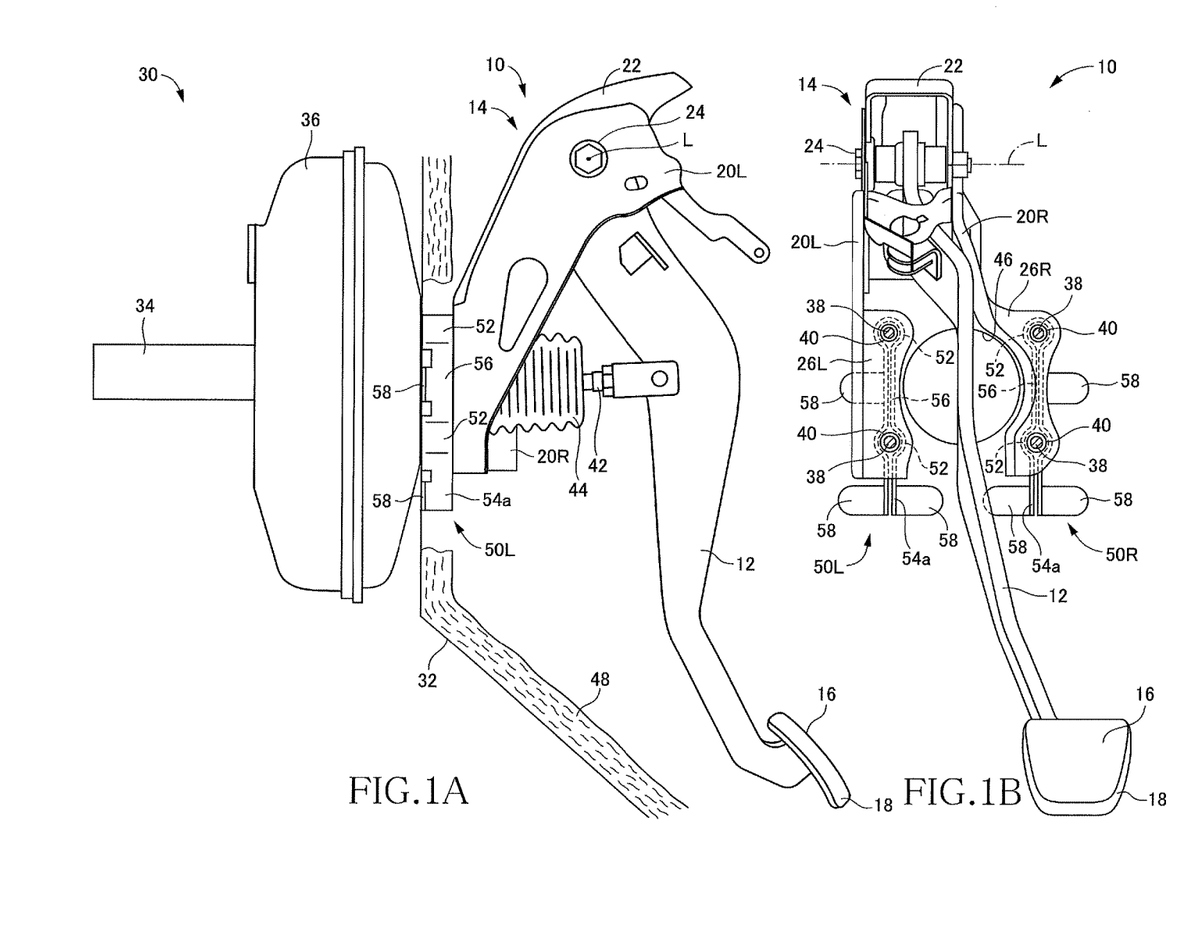
FIG. 1A is a side view showing a state in which a pedal device is mounted by a mounting structure for the pedal device according to one embodiment and FIG. 1B is a front view showing the state of FIG. 1A.

As shown in FIGS. 1A and 1B, a pedal device 10 mounted by a mounting structure according to one embodiment constitutes a hydraulic brake system and includes a pedal 12 and a bracket 14 that pivotally holds the pedal 12. (The bracket 14 may be referred to as "pedal support".) The pedal 12 is held, at its proximal portion (upper end portion), by the bracket 14 so as to be pivotable about a pivot axis L extending in a lateral direction, specifically, extending horizontally in a right-left direction. The pedal 12 has, at its distal portion (lower end portion), a stepping portion 18 having one surface functioning as a stepping surface 16. In the following explanation, the up-down direction in FIGS. 1A and 1B will be referred to as "up-down direction", the right-left direction in FIG. 1B will be referred to as "right-left direction", and the right-left direction in FIG. 1A will be referred to as "front-rear direction". Specifically, the forward side of the vehicle, i.e., the leftward side in FIG. 1A, will be referred to as "forward side" and the rearward side of the vehicle, i.e., the rightward side in FIG. 1A, will be referred to as "rearward side".

The bracket 14 includes: a pair of side wall members 20R, 20L that respectively constitute right and left side walls; a connecting member 22 that connects the side wall members 20R, 20L; and a shaft 24 that extends between distal portions of the respective side wall members 20R, 20L. The shaft 24 defines the pivot axis L indicated above. The shaft 24 extends through the proximal portion of the pedal 12 so as to pivotally support the pedal 12. The side wall members 20R, 20L are bent at respective proximal portions thereof, so that flanges 26R, 26L are formed.

As shown in FIG. 1A, the pedal device 10 is mounted onto the dash panel 32 such that the dash panel 32 is sandwiched by and between the bracket 14 and the master cylinder device 30. The master cylinder device 30 includes a master cylinder 34 and a negative-pressure booster 36. Four bolts 38 each functioning as a fastening rod are fixed to the negative-pressure booster 36. The four bolts 38 extend rearward.

The dash panel 32 has four holes through which the respective four bolts 38 extend. In other words, the four bolts 38 penetrate the respective four holes. Two holes 40 are formed in each of the flanges 26R, 26L of the bracket 14. In other words, the bracket 14 has four holes 40. The pedal device 10 and the master cylinder device 30 are disposed such that the four bolts 38 extend through the respective four holes of the dash panel 32 and the respective four holes 40 of the bracket 14. The pedal device 10 and the master cylinder device 30 are fastened to each other so as to sandwich the dash panel 32 therebetween by screwing a nut (not shown) onto an external thread formed at a rear end of each of the four bolts 38. The pedal device 10 is thus mounted onto the dash panel 32.

The link rod 42 (which may be referred to as "piston rod") and a dust boot 44 of the master cylinder device 30 extend rearward through a hole 46 formed in the dash panel 32, so as to be enclosed or surrounded by the four bolts 38. The link rod 42 is coupled, at its rear end, to an intermediate portion of the pedal 12 between the proximal portion and the distal portion such that the link rod 42 is pivotable relative to the pedal 12. (In FIG. 1B, the link rod 42 and the dust boot 44 are not illustrated.)

In a state in which the pedal device 10 is mounted on the dash panel 32, the proximal portion of the pedal 12, namely, the pivot axis L, is located above the four bolts 38 while the distal portion of the pedal 12, namely, the stepping surface 16 of the pedal 12, is located below the four bolts 38.

In a vehicle on which the pedal device 10 is mounted, one of opposite surfaces of the dash panel 32 located nearer to the rear side of the vehicle is covered with a sound insulator 48, as shown in FIG. 1A. The sound insulator 48 is formed of fabric having a relatively large thickness and is bonded to substantially the entirety of the one surface of the dash panel 32. It is thus necessary to provide, between the bracket 14 of the pedal device 10 and the dash panel 32, a space larger than the thickness of the sound insulator 48. In the present mounting structure, a pair of spacers 50R, 50L are disposed for spacing the bracket 14 and the dash panel 32 apart from each other in a state in which the pedal device 10 is mounted on the dash panel 32. Specifically, the spacer 50R is interposed between the flange 26R of the side wall member 20R and the dash panel 32 while the spacer 50L is interposed between the flange 26L of the side wall member 20L and the dash panel 32.

Figure 2:
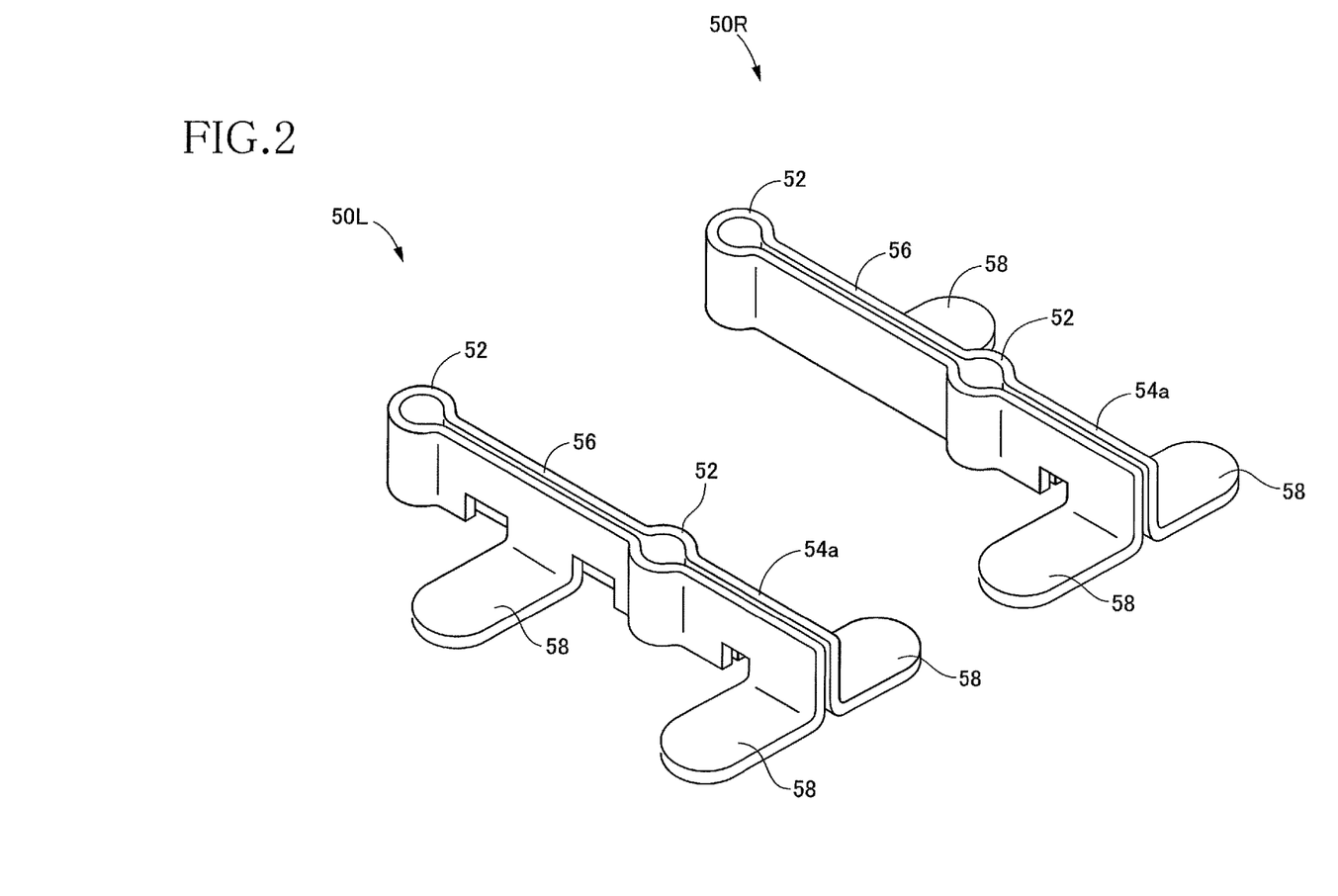
FIG. 2 is a perspective view of spacers that constitute the mounting structure for the pedal device according to the embodiment.

As shown in FIG. 2, the spacers 50R, 50L are symmetrical in shape. Each of the pair of spacers 50R, 50L is formed by bending one steel sheet. As apparent from FIGS. 1A and 1B, each spacer 50R, 50L is disposed such that its lower right portion in FIG. 2 is located at a lower position and its upper left portion in FIG. 2 is located at an upper position.

Each of the spacers 50R, 50L has: a pair of collar portions 52 through each of which the bolt 38 extends; an extending portion 54a that extends from the lower collar portion 52 along the dash panel 32 in the downward direction, namely, in the vertically downward direction in the present mounting structure; and a connecting portion 56 that connects the pair of collar portions 52 to each other. The extending portion 54a has two attachment pieces 58 that respectively extend rightward and leftward along the dash panel 32. The connecting portion 56 of the spacer 50R has one attachment piece 58 that extends rightward along the dash panel 32 while the connecting portion 56 of the spacer 50L has one attachment piece 58 that extends leftward along the dash panel 32. The attachment pieces 58 are bonded to the dash panel 32 by spot welding, so that the spacers 50R, 50L are fixed to the dash panel 32.

In each of the thus constructed spacers 50R, 50L, the pair of collar portions 52 (hereinafter referred to as "collars 52" where appropriate) may be regarded as an integral unit connected to each other by the connecting portion 56. Specifically, as apparent from FIGS. 1A and 1B, two of the four collars 52 arranged in the up-down direction serve as the pair of collars 52. Thus, two pairs of collars 52 that are spaced apart from each other in the lateral direction are provided in the present mounting structure. The two pairs of collars 52 are disposed at the same position in the up-down direction. Two collars in one pair are integral with each other so as to serve as the spacer 50R, and two collars in another pair are integral with each other so as to serve as the spacer 50L.

One collar of each pair of collars 52 has the extending portion 54a formed integrally therewith so as to extend along the dash panel 32 in a direction away from the other collar of each pair of collars 52. As apparent from FIGS. 1A and 1B, the extending portion 54a extends from the lower one of the pair of collars 52 in each of the spacers 50R, 50L straightly in the downward direction (in the vertically downward direction in a strict sense).

The pair of collars 52 connected to each other contribute to reduction in the number of components of the present mounting structure and also contribute to simplification of fixing work for fixing the pair of collars 52 to the dash panel 32.

Figure 3A:
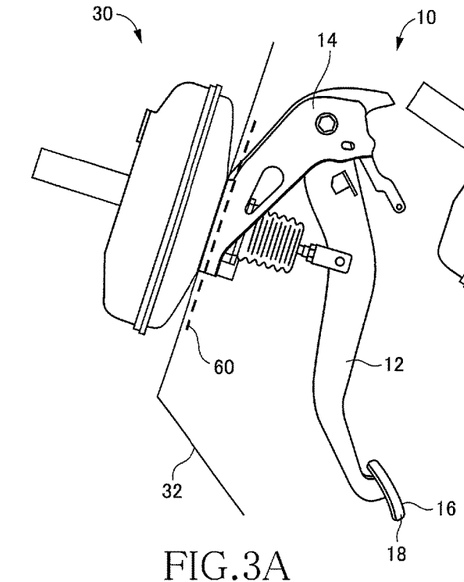
FIG. 3A is a side view showing a state in which the pedal device is mounted by a conventional mounting structure.

As shown in FIG. 3A, the pedal device 10 is conventionally mounted without the above-indicated spacers interposed between the dash panel 32 and the bracket 14. In this case, when the pedal 12 is stepped on, the dash panel 32 is deformed as shown in FIG. 3C. Specifically, though an enclosed area R1 that is enclosed with the four collar portions 52 is not deformed, the dash panel 32 is bent at an area R2 above the enclosed area R1 and at an area R3 below the enclosed area R1, so that the dash panel 32 is deformed with the upper area R2 and the lower area R3 bent as shown in FIG. 3C. In other words, the dash panel 32 is deformed such that the upper area R2 is displaced toward the pedal operator and the lower area R3 is displaced away from the pedal operator. In view of the configuration of the pedal device 10 and the positional relationship of the pedal device 10 that is mounted, namely, in view of the positional relationship in which the pivot axis L of the pedal 12 is located above the four bolts 38 and the stepping surface 16 of the pedal 12 is located below the four bolts 38 in a state in which the pedal device 10 is mounted on the dash panel 32, bending of the dash panel 32 at the lower area R3 is considerably larger than bending of the dash panel 32 at the upper area R2.

Figure 3B:
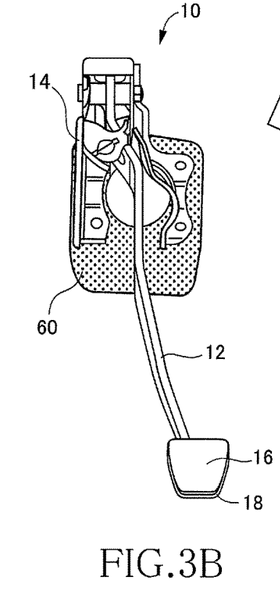
FIG. 3B is a front view showing the state of FIG. 3A.
Figure 3C:
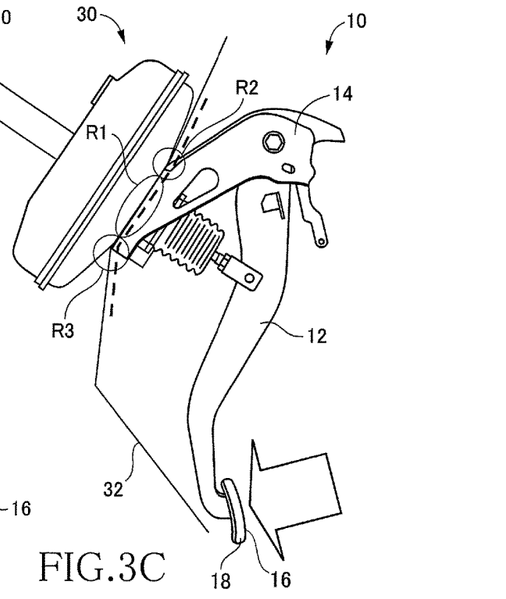
FIG. 3C is a side view schematically showing a state in which the pedal of the pedal device is stepped on in the state of FIGS. 3A and 3B.

For reducing the deformation of the dash panel 32, it can be considered that a reinforcing plate 60 is bonded to the region of the dash panel 32 on which the pedal device 10 is mounted and its surrounding region, as shown in FIG. 3B. In FIGS. 3A and 3C, the reinforcing plate 60 is indicated by the broken line for the sake of convenience.

In an instance where the reinforcing plate 60 has a relatively small thickness, however, the effect of reducing the deformation of the dash panel 32 is not so high even if the reinforcing plate 60 is bonded. The thickness of the reinforcing plate 60 needs to be increased for enhancing the effect of reducing the deformation. The increased thickness of the reinforcing plate 60 increases the weight of the reinforcing plate 60, which in turn increases the weight of the vehicle body.

Figure 3D:
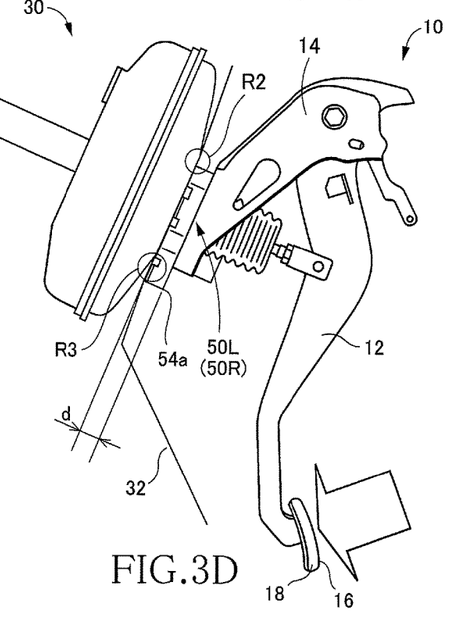
FIG. 3D is a side view schematically showing a state in which the pedal is stepped on in an instance where the pedal device is mounted by the mounting structure for the pedal device according to the embodiment.

In the present mounting structure, the spacers 50R, 50L shown in FIG. 2 are interposed between the bracket 14 of the pedal device 10 and the dash panel 32, as shown in FIGS. 1A and 1B. Consequently, the extending portion 54a of each of the spacers 50R, 50L, namely, the extending portion 54a provided on the lower one of the pair of collar portions 52 (the collars 52), is held in contact with the lower area R3, as shown in FIG. 3D. Owing to the extending portions 54a, the bending of the dash panel 32 at the lower area R3 is prevented when the pedal 12 is stepped on, so that the deformation of the dash panel 32 is reduced. That is, the deformation of the dash panel 32 is reduced by the mechanism explained above.

The thickness d of the extending portion 54a, namely, the dimension d of the extending portion 54a in a direction perpendicular to the dash panel 32, is equal to the length of the collar portion 52, namely, equal to the distance between the dash panel 32 and the bracket 14 of the pedal device 10. Thus, the thickness (dimension) d of the extending portion 54a can be made considerably larger than the thickness of the reinforcing plate 60. The thickness d ensures a high degree of reducing the deformation without involving a significant increase in the weight of the vehicle even though the extending portion 54a is formed of a relatively thin steel sheet. The extending portion 54a provides the effect of reducing the deformation similar to that obtained when the rib is provided on the dash panel 32 and functions as a reinforcing member for reducing the deformation of the dash panel 32 caused when the pedal 12 is stepped on. In this respect, the bending at the upper area R2 is prevented by preventing the bending at the lower area R3.

There will be explained some modified embodiments of the mounting structure. Specifically, some modified embodiments of the spacer will be explained below.

Figure 4A:
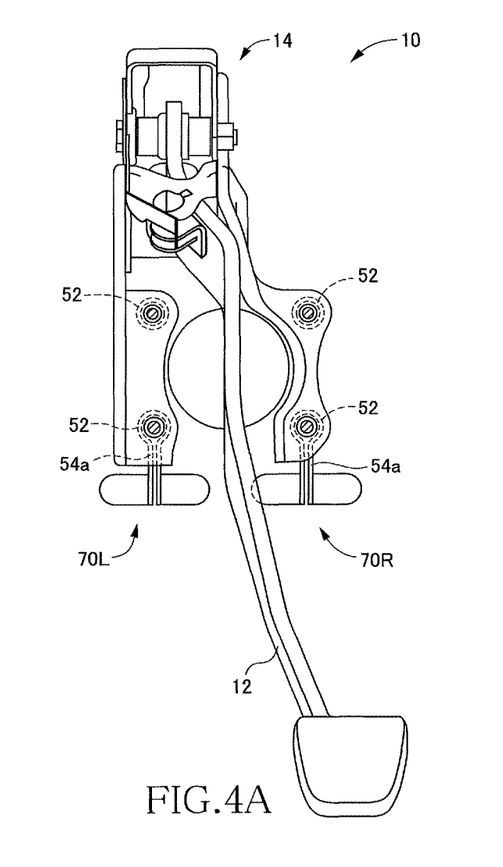
FIGS. 4A and 4B are front views each showing a state in which the pedal device is mounted by a mounting structure for the pedal device according to another embodiment.

In the mounting structure shown in FIG. 4A, spacers 70R, 70L are employed in place of the spacers 50R, 50L of the illustrated embodiment. The spacers 70R, 70L differ from the spacers 50R, 50L in that each spacer 70R, 70L does not have the connecting portion 56. That is, the extending portion 54a is provided on one of the pair of collars 52 which are disposed independently of each other. The mounting structure shown in FIG. 4A also ensures the effect of reducing the deformation of the dash panel 32 equal to that obtained in the mounting structure of the illustrated embodiment.

Figure 4B:
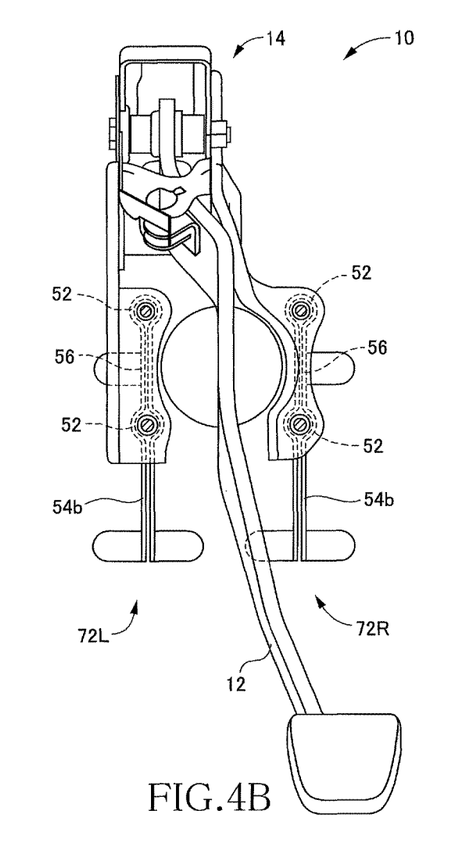

In the mounting structure shown in FIG. 4B, spacers 72R, 72L are employed in place of the spacers 50R, 50L of the illustrated embodiment. Each of the spacers 72R, 72L has an extending portion 54b that extends by an amount larger than an amount by which the extending portion 54a of each spacer 50R, 50L extends. The effect of reducing the deformation of the dash panel 32 can be increased with an increase in the amount of extension of the extending portion.

Figure 5A:
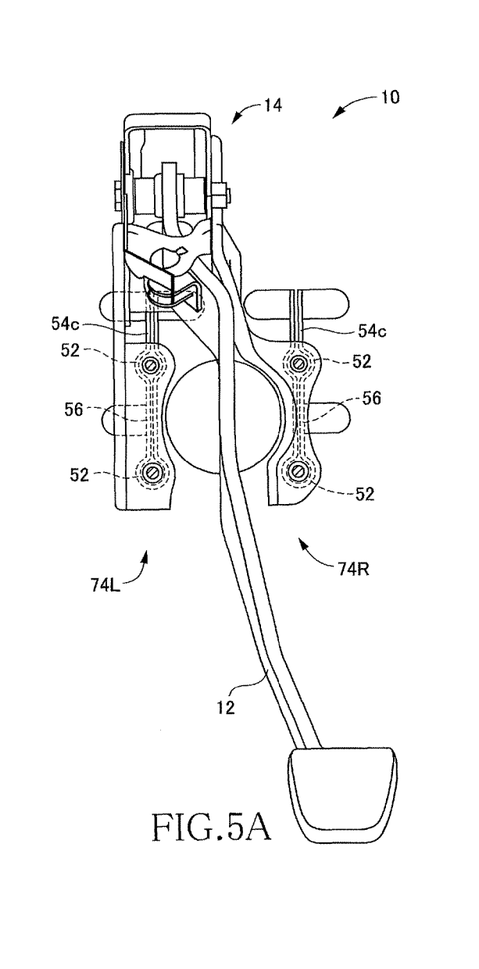
FIGS. 5A and 5B are front views each showing a state in which the pedal device is mounted by a mounting structure for the pedal device according to still another embodiment.

In the mounting structure shown in FIG. 5A, spacers 74R, 74L are employed in place of the spacers 50R, 50L of the illustrated embodiment. Each of the spacers 74R, 74L has an extending portion 54c in place of the extending portion 54a of each spacer 50R, 50L, namely, in place of the extending portion 54a that extends downward from the lower one of the pair of collar portions 52. The extending portion 54c extends from the upper one of the pair of collar portions 52 in the upward direction (in the vertically upward direction, in a strict sense) by an amount equal to the amount of extension of the extending portion 54a. The thus formed extending portions 54c prevent the bending of the dash panel 32 at the upper area R2 shown in FIG. 3C, so that the deformation of the dash panel 32 is reduced.

Figure 5B:
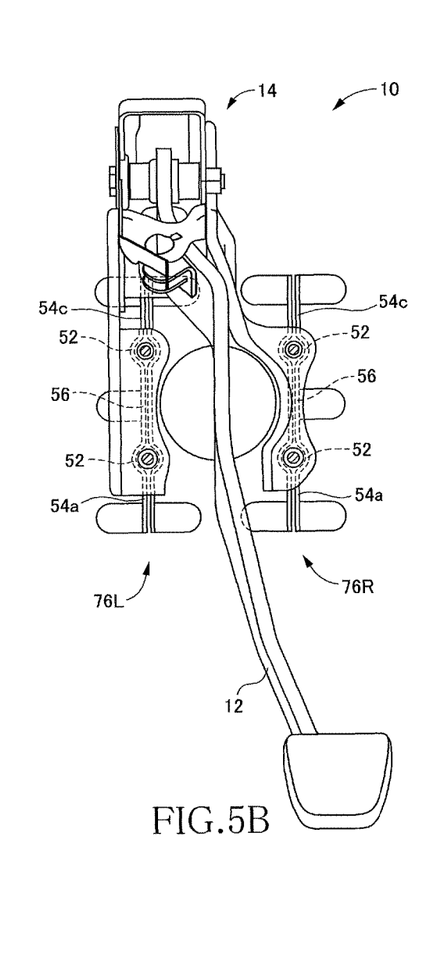

In the mounting structure shown in FIG. 5B, spacers 76R, 76L are employed in place of the spacers 50R, 50L of the illustrated embodiment. It may be regarded that each spacer 76R, 76L is formed by adding the extending portion 54c described above to each spacer 50R, 50L. That is, each of the pair of collar portions 52 is provided with the extending portion that extends upward or downward. According to the mounting structure, both of the upper area R2 and the lower area 3 shown in FIG. 3C can be prevented from being bent, so that a higher effect of reducing the deformation of the dash panel 32 can be obtained.

Figure 6A:
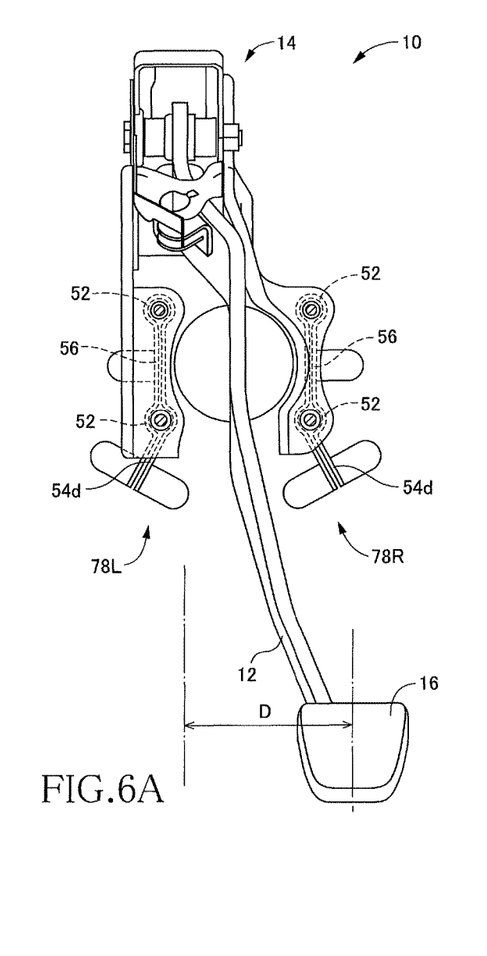
FIGS. 6A and 6B are front views each showing a state in which the pedal device is mounted by a mounting structure for the pedal device according to yet another embodiment.
Figure 6B:
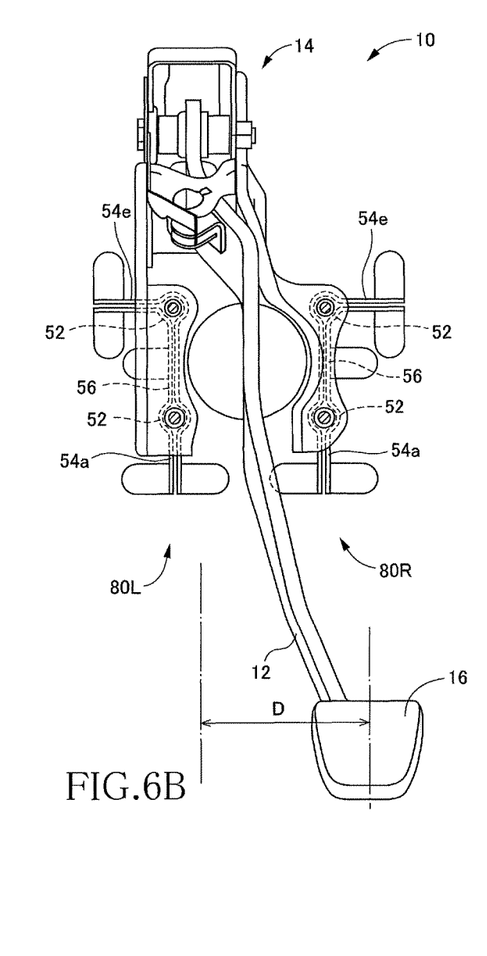

The pedal device 10 is disposed such that the distal portion is shifted in the lateral direction relative to the proximal portion. Specifically, the stepping surface 16 is shifted rightward by a shift amount D relative to the proximal portion, as shown in FIGS. 6A and 6B. Consequently, when the pedal 12 is stepped on, the dash panel 32 is deformed in the right-left direction, in addition to the up-down direction. That is, the dash panel 32 is deformed such that a portion located on the left side of the enclosed area R1 is displaced toward the pedal operator while a portion located on the right side of the enclosed area R1 is displaced away from the pedal operator.

In view of the deformation of the dash panel 32 in the right-left direction, spacers 78R, 78L are employed in the mounting structure shown in FIG. 6A, in place of the spacers 50R, 50L of the illustrated embodiment. Each of the spacers 78R, 78L is provided with an extending portion 54d, in place of the extending portion 54a of each spacer 50R, 50L. The extending portion 54d obliquely extends, namely, the extending portion 54d extends so as to be inclined in the lateral direction. Specifically, the spacer 78R is provided with the extending portion 54d that extends downward so as to be inclined in the rightward direction while the spacer 78L is provided with the extending portion 54d that extends downward so as to be inclined in the leftward direction. In other words, the spacer 78R has the extending portion 54d that extends to the lower right while the spacer 78L is provided with the extending portion 54d that extends to the lower left. The mounting structure that employs the spacers 78R, 78L having the thus constructed extending portions 54d ensures not only the effect of reducing the deformation of the dash panel 32 in the up-down direction, but also the effect of reducing the deformation of the dash panel 32 in the right-left direction owing to a mechanism similar to that explained above.

In the mounting structure shown in FIG. 6B, spacers 80R, 80L are employed in place of the spacers 50R, 50L of the illustrated embodiment, in view of the deformation of the dash panel 32 in the right-left direction. It may be regarded that each spacer 80R, 80L is formed by adding the extending portion 54e described above to each spacer 50R, 50L. The extending portion 54e of the spacer 80R extends rightward from an upper one of the pair of collar portions 52 while the extending portion 54e of the spacer 80L extends leftward from an upper one of the pair of collar portions 52. The mounting structure that employs the spacers 80R, 80L having the thus constructed extending portions 54e ensures effective reduction of the deformation of the dash panel 32 in the right-left direction owing to a mechanism similar to that explained above.

In the mounting structure having the spacers 80R, 80L shown in FIG. 6B, it may be considered that the upper one of the pair of collar portions 52 of the spacer 80R and the upper one of the pair of collar portions 52 of the spacer 80L constitute a pair of collars 52. In this case, the extending portion 54e may be regarded as an extending portion that extends from one of the pair of collars 52 in a direction away from the other of the pair of collars 52 along the dash panel 32.

What is claimed is:

1. A mounting structure for a pedal device that includes a pedal and a bracket that pivotally holds the pedal, the mounting structure being configured to mount the pedal device on a dash panel with the dash panel sandwiched by and between the bracket and a master cylinder device, the mounting structure comprising:
   a plurality of fastening rods that are configured to respectively extend through a plurality of holes formed in the dash panel for fastening the bracket and the master cylinder device to each other; and
   a plurality of collars configured to be interposed between the dash panel and the bracket for spacing the dash panel and the bracket apart from each other, the plurality of fastening rods respectively extending through the plurality of collars, wherein
   the plurality of collars includes a pair of collars,
   each of the collars has a first end that contacts the dash panel and a second end that contacts the bracket, a depth of each collar being equal to a distance between the first and second ends of each collar, the depth corresponding to a spacing distance by which the mounting structure spaces the bracket from the dash panel,
   a first one of the pair of collars has an extending portion that extends along the dash panel in a direction away from a second one of the pair of collars, the extending portion being flush with the first end of the collars so as to contact the dash panel when the mounting structure mounts the pedal device on the dash panel thereby reinforcing the dash panel and reducing deformation of the dash panel caused when the pedal is stepped on, and
the extending portion includes a first piece that extends in a first direction away from the second one of the pair of collars and an attachment piece that extends in a second direction different from the first direction and away from the first piece, first ends of the first piece and of the attachment piece being flush with the first end of the collars so as to contact the dash panel when the mounting structure mounts the pedal device on the dash panel.

2. The mounting structure according to claim 1, wherein
the pedal device is configured to be mounted on the dash panel such that the pedal is held at a proximal portion thereof by the bracket so as to be pivotable about a pivot axis extending in a lateral direction and such that the pivot axis is located above the plurality of fastening rods while a stepping surface provided at a distal portion of the pedal is located below the plurality of fastening rods, and
the pair of collars consists of two of the plurality of collars that are spaced from each other in an up-down direction, and the first piece of the extending portion extends upward or downward.

3. The mounting structure according to claim 2, wherein the first one of the pair of collars that has the extending portion is located below the second one of the pair of collars, and the first piece of the extending portion extends downward.

4. The mounting structure according to claim 2, wherein the first one of the pair of collars that has the extending portion is located above the second one of the pair of collars, and the first piece of the extending portion extends upward.

5. The mounting structure according to claim 2, wherein
the pedal device is configured such that the distal portion of the pedal is shifted with respect to the proximal portion of the pedal in a lateral direction, and
the extending portion extends so as to be inclined in the lateral direction.

6. The mounting structure according to claim 2, wherein the plurality of collars includes two pairs of collars, each of the pairs of collars having a corresponding extending portion on at least one of the collars, the two pairs of collars being spaced from each other in a lateral direction and located at a same position in the up-down direction.

7. The mounting structure according to claim 1, wherein the pair of collars are connected to each other.

8. The mounting structure according to claim 1, wherein the first piece has a depth equal to the depth of the collars and the attachment piece has a depth that is less than the depth of the collars.

9. A pedal arrangement for a vehicle, the pedal arrangement comprising:
a bracket;
a pedal pivotally attached to the bracket;
a plurality of fastening rods attached to the bracket and configured to fasten the bracket to a master cylinder device with a dash panel of the vehicle interposed between the bracket and the master cylinder device; and
a plurality of collars configured to be interposed between the dash panel and the bracket to space the dash panel from the bracket, the plurality of fastening rods respectively extending through the plurality of collars, wherein
the plurality of collars includes a pair of collars,
each of the collars has a first end that contacts the dash panel and a second end that contacts the bracket, a depth of each collar being equal to a distance between the first and second ends of each collar, the depth corresponding to a spacing distance by which the bracket is spaced from the dash panel,
a first collar of the pair of collars has an extending portion that extends along the dash panel in a direction away from a second collar of the pair of collars, the extending portion being flush with the first end of the collars to contact the dash panel when the collars are interposed between the bracket and the dash panel, and
the extending portion includes a first piece that extends in a first direction away from the second collar and an attachment piece that extends in a second direction different from the first direction and away from the first piece, first ends of the first piece and of the attachment piece being flush with the first end of the collars so as to contact the dash panel when the collars are interposed between the bracket and the dash panel.

10. The pedal arrangement according to claim 9, wherein
a proximal portion of the pedal is pivotally attached to the bracket so as to be pivotable about a pivot axis extending in a lateral direction, the pivot axis being located above the plurality of fastening rods,
a stepping surface is provided at a distal portion of the pedal, the stepping surface being located below the plurality of fastening rods, and
the first and second collars of the pair of collars are spaced from each other in an up-down direction, and the first piece of the extending portion extends upward or downward.

11. The pedal arrangement according to claim 10, wherein the first collar which has the extending portion is located below the second collar, and the first piece of the extending portion extends downward.

12. The pedal arrangement according to claim 10, wherein the first collar which has the extending portion is located above the second collar, and the first piece of the extending portion extends upward.

13. The pedal arrangement according to claim 10, wherein
the distal portion of the pedal is shifted with respect to the proximal portion of the pedal in a lateral direction, and
the extending portion extends so as to be inclined in the lateral direction.

14. The pedal arrangement according to claim 10, wherein the plurality of collars includes two pairs of collars, each of the pairs of collars having a corresponding extending portion on at least one of the collars, the two pairs of collars being spaced from each other in a lateral direction and located at a same position in the up-down direction.

15. The pedal arrangement according to claim 9, wherein the first and second collars of the pair of collars are connected to each other.

16. The pedal arrangement according to claim 9, wherein the first piece has a depth equal to the depth of the collars and the attachment piece has a depth that is less than the depth of the collars.

* * * * *